2,816,839
PRESERVATION OF WALNUTS

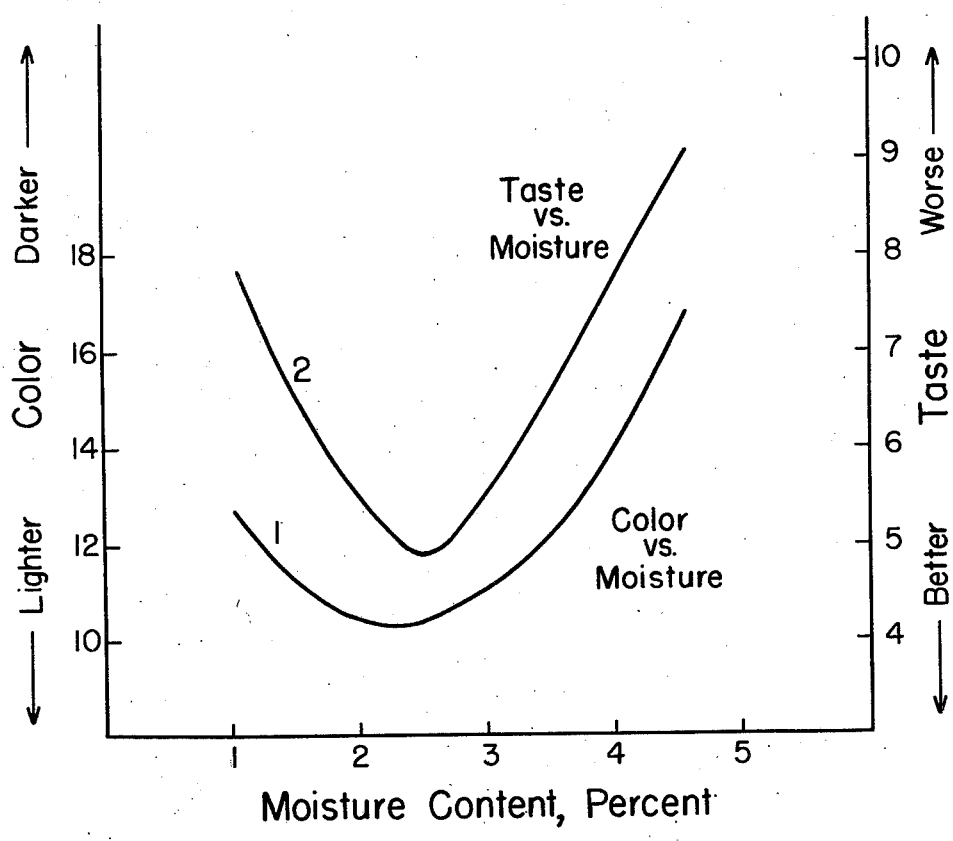

Louis B. Rockland, Pasadena, Calif., assignor to the United States of America as represented by the Secretary of Agriculture Application April 8, 1955, Serial No. 500,315

3 Claims. (Cl. 99—199)

(Granted under Title 35, U. S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to the preservation of walnuts (*Juglans regia*). The objects of the invention include the provision of processes for conditioning walnuts whereby they are stabilized and so can be kept for long periods of time without detriment to their color or flavor. Further objects and advantages of the invention will be obvious from the description herein taken in connection with the annexed drawing. In the drawing the sole figure is a graphic representation of the effect of moisture content on the stability of walnuts.

It is well known in the industry that walnuts are a relatively unstable food product. On standing at ambient temperatures walnuts deteriorate rapidly in that pellicle about the kernels becomes dark in color and the nuts assume a rancid odor and taste. Thus if the nuts are kept for 2 or 3 months they become definitely stale and inferior to the fresh product. Usually to preserve the nuts in the interim between harvests, growers and packers store the nuts in refrigerated warehouses. Such storage is of course expensive and is not suited for the retail trade where open display on shelves is greatly to be preferred. Oftentimes walnuts for the retail trade are packaged in tin cans under vacuum. Elimination of light and oxygen in this manner has some protective value but even then the product develops noticeable off-flavors in 3 or 4 months or less if kept at the higher temperatures prevalent in summer in most of the country.

It has now been found that the moisture content of walnut kernels has a profound influence on the stability of the nuts. In essence it has been determined that there exists an optimum moisture range at which the nuts exhibit maximum stability. This optimum moisture range is generally from 2 to 3%.

It is recognized as a general principle in food technology that the stability of many foods is increased by decrease in moisture content. For example it has been shown that powders prepared by dehydrating fruit juices can best withstand the effects of storage at high temperature by dehydrating them to the utmost extent using an in-package desiccant such as quick lime to absorb any last traces of moisture which cannot be removed in the regular dehydration procedure.

In the case of walnuts, however, it has been found that the general principle does not apply and surprisingly enough if the moisture content is decreased to below the optimum level, the nuts exhibit decreased stability. Thus, as the moisture content of the walnut kernels is decreased from the normal level (about 4 to 5%) the nuts become increasingly stable and maximum stability is reached when the moisture content is about 2 to 3%. If the nuts are further dehydrated it will be noted that the curve of stability versus moisture passes through a minimum and the nuts decrease in stability. This situation is clearly demonstrated in the examples below.

It is a feature of this invention that walnuts dried to the designated level are so enhanced in stability that most of the storage treatments applied to conventional walnuts may be eliminated without losing quality. For example, the use of refrigeration may be eliminated and the conditioned nuts may be held at ordinary (room) temperature. Packaging in metal containers under vacuum or in an inert gas to prevent light and air from contacting the nuts need not be used. Instead the conditioned nuts may be packaged in plastic film envelopes without applying vacuum or replacement of air with an inert gas. It is evident that application of this invention results in simplifying and reducing the costs of packaging and storing the nuts.

In applying this invention, fresh walnuts are subjected to dehydration, or, what may be termed conditioning, to reduce the moisture content of the kernels to the optimum level. This dehydration may be performed in any of a number of ways. For example the nuts may be placed in a conventional dehydrator of the shelf, continuous belt, or rotary kiln type where they are subjected to a current of warm air. To prevent damage to the quality of the nuts, the air temperature should be kept below about 125° F., preferably below 110° F. The temperature of the nut meats should never be higher than 100° F. Generally, the drying temperature is maintained at a minimum while the nuts are relatively moist and gradually increased to not more than 125° F. as the nuts approach the optimum moisture content. In the drying operation, care should be exercised not to reduce the moisture content of the nuts below the optimum range. It has been found that if this is done certain irreversible changes occur so that if the over-dried product is remoistened to the optimum moisture range it will not exhibit maximum stability as will a product in which the dehydration is limited to obtain directly the optimum moisture level. To prevent over-drying it is preferred that during dehydration the nuts be contacted with air (70–100° F.) which has a relative humidity of less than 15%, for example, 0 to 5%. By selection of suitable temperature and humidity within these ranges, the nuts may be processed to the point where equilibrium between the moisture in the air and that in the nuts is reached at which point the moisture content of the nuts will be at the optimum level and no further dehydration can take place. It is also obvious that if desired vacuum dehydration techniques can be applied to reduce the moisture content of the nuts. Regardless of the technique applied, the nuts should be dehydrated until the kernels contain about 2 to 3% water, preferably 2.65±0.25% water.

Usually the partial dehydration as described above is applied to the walnut kernels removed from the shells. However, the dehydration may be applied to the in-shell (whole) nuts. In such case the optimum moisture content of the entire nut would be about from 7.0 to 8.5% since the shell contains approximately two-thirds of the water in the whole nut. Where the whole nuts are reduced to 7 to 8.5% moisture the kernels will contain the optimum moisture content of 2 to 3%.

After the walnuts are partially dehydrated, or conditioned, as above described, they are stored under such circumstances that loss or gain of moisture is substantially prevented. Thus the nuts may be placed in hermetically sealed vessels such as jars or cans. A preferred packaging technique is to seal them in bags made of a transparent, essentially moisture-impermeable plastic film. Examples of such materials are polyvinylidene chloride, polyethylene terephthalate, rubber hydrochloride or laminates of these with other films such as cellophane, polyethylene, polyfluoroethylene, nylon, etc. This packaging technique offers many advantages over packaging in tin cans as now generally employed in packaging walnuts at their normal moisture level. In the first place, the film package is transparent and the consumer can readily observe the product at the market or elsewhere. Visibility of product is well known to be an important factor in retail selling. In the second place, such film packages are cheaper than metal containers and being lighter in weight, shipping costs are reduced. The nuts conditioned in accordance with this invention can be packaged in transparent films because of the high stability of the nuts. Thus the conditioning treatment so drastically changes the properties of the nuts that it is no longer necessary to use light-proof containers and other protective measures as are necessary with walnuts at the normal moisture content.

As described above, the basic factor in storing the walnuts conditioned in accordance with this invention involves maintaining them in an environment such that no moisture gain or loss occurs. It is obvious that if desired one can apply any type of protective treatment in the packaging or storing of the nuts. For example the conditioned nuts may be hermetically sealed in containers of glass, metal, plastic film, etc. under vacuum or in an atmosphere of nitrogen or other inert gas. Further, antioxidants may be applied to the surface of the nuts for example by coating them with an edible fatty material containing fat-stabilizing antioxidants.

The invention is further illustrated by the following examples:

EXAMPLE I

A batch of fresh walnut meats was subjected to dehydration by contacting them with dehumidified air at room temperature. One lot (A) was dehydrated until its moisture content was 1.4% the other (B) until its moisture content was 2.5%.

The partially dehydrated walunts and a sample of the original nut meats (C) having a moisture content of 4.5% were sealed in glass jars and stored at various times and temperatures (as indicated below).

After storage the products were subjected to organoleptic tests by a panel of trained food tasters. The nuts were judged on a hedonic scale giving a score of 1 for excellent taste and 10 for very rancid. The color of the nut pellicles was determined in each case by extracting the nuts with alcohol and measuring the color density of the resulting solution with a spectrophotometer. The color readings are based on an arbitrary scale of zero for pure water and increasing numbers for increasing color density.

The conditions used and the results obtained are set forth in the tables below:

*Table 1.—Effect of conditioning on taste*

| Sample | Moisture content, percent | Taste of walnuts | | | |
|---|---|---|---|---|---|
| | | Before storage | After storage at 140° F. for 5 days | After storage at 140° F. for 10 days | After storage at 100° F. for 7 months |
| A | 1.4 | 2.0 | 5.7 | 6.9 | 9.0 |
| B | 2.5 | 2.0 | 4.7 | 5.0 | 6.5 |
| C | 4.5 | 2.0 | 7.2 | 8.7 | 9.3 |

*Table 2.—Effect of conditioning on color*

| Sample | Moisture content, percent | Before storage | After storage at 140° F. for 5 days | After storage at 140° F. for 10 days | After storage at 100° F. for 7 months |
|---|---|---|---|---|---|
| A | 1.4 | 6.7 | 8.9 | 10.5 | 11.4 |
| B | 2.5 | 5.9 | 8.3 | 9.9 | 9.6 |
| C | 4.5 | 5.4 | 12.0 | 15.3 | 10.0 |

EXAMPLE II

A batch of fresh walnut meats was divided into a series of samples each sample being dehydrated to a different moisture level by subjecting each sample to dehumidified air at room temperature. The partially dehydrated nuts plus a sample of the original, non-dehydrated nuts (4.5% moisture content) were stored in sealed jars at 140° F. for 11 days. After this period, the samples were tested for color of the pellicle and the products were judged on an organoleptic basis using the same procedures as described in Example I. The conditions used and results obtained are set forth in the figure of the attached drawing in graphic form. Curve 1 represents a plot of the moisture content of each sample versus the color value. Curve 2 represents a plot of the moisture content of each sample versus the taste score. It is evident from the curve that maximum stability was imparted to those nuts which had been dehydrated to the extent that their moisture content was about 2.5%.

EXAMPLE III

A batch of fresh walnut kernels was divided into a series of samples, each sample being dehydrated to a different moisture level. The samples were then stored in sealed jars for 2 months, one lot of each sample being stored at 38° F. and another lot of each sample being stored at 95° F. After the storage period, the nuts were tested for color using the technique described in Example I. The results obtained are tabulated below:

| Moisture content of nuts | Color after storage 2 months at 38° F. | Color after storage 2 months at 95° F. |
|---|---|---|
| 1.0 | 11 | 17 |
| 2.0 | 10 | 11 |
| 3.0 | 9 | 10 |
| 4.0 | 9 | 13 |
| 5.0 | 9 | 22 |
| 6.0 | 9 | 33 |
| 7.0 | 9 | 47 |

It is evident from the above data that the nuts which have optimum moisture content need not be stored under refrigeration since they are essentially as stable at 95° F. as they are at 38° F. On the other hand the nuts which have moisture contents above or below the optimum exhibit a decreasing stability when stored at high temperatures. Thus nuts with such moisture contents must be stored under refrigeration to preserve their quality.

Having thus described the invention, what is claimed is:

1. A method of preserving walnuts which comprises partially dehydrating fresh walnuts to reduce their moisture content of the kernels to about from 2 to 3% and thereafter storing the partially dehydrated walnuts at said moisture level in an essentially moisture-impenetrable container and at ordinary temperatures.

2. A method of preserving walnuts which comprises partially dehydrating fresh walnuts to reduce their moisture content of the kernels to about from 2 to 3% and thereafter storing the partially dehydrated walnuts at said moisture level in an essentially moisture-impenetrable container.

3. A method of preserving walnuts which comprises partially dehydrating fresh walnut kernels to reduce the moisture content of the kernels to about from 2 to 3% and thereafter storing the partially dehydrated walnut kernels at said moisture level in an essentially moisture-impermeable container.

References Cited in the file of this patent

UNITED STATES PATENTS

| | | |
|---|---|---|
| 1,915,242 | Ribeiro | June 20, 1933 |
| 2,542,206 | Nichols | Feb. 20, 1951 |
| 2,570,478 | Pitzl | Oct. 9, 1951 |

OTHER REFERENCES

Winton et al.: "The Structure and Composition of Foods," vol. 1, page 393, pub. 1932.

Jacobs: Food and Food Products, vol 2, second edition, page 1578.

Chatfield et al.: United States Department of Agriculture Circular No. 549, June 1940, page 88.